3,028,286
DISCONTINUOUS BATCH WASHING OF SILICA FIBER CLOTH
Leon Parker, Burbank, Eugene C. Wang, La Puente, and Robert C. Nordberg, La Mirada, Calif., assignors to H. I. Thompson Fiber Glass Co., Los Angeles, Calif., a corporation of California
Filed Sept. 2, 1958, Ser. No. 758,182
7 Claims. (Cl. 156—24)

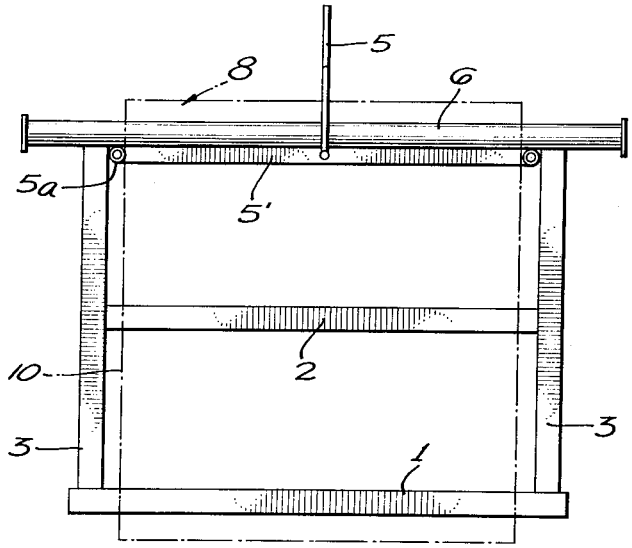
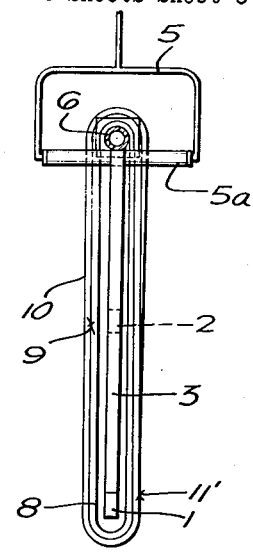
FIG. 6.   FIG. 7.
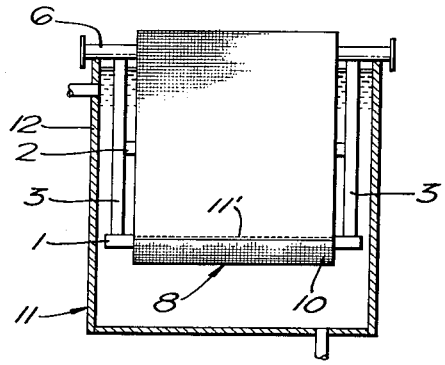
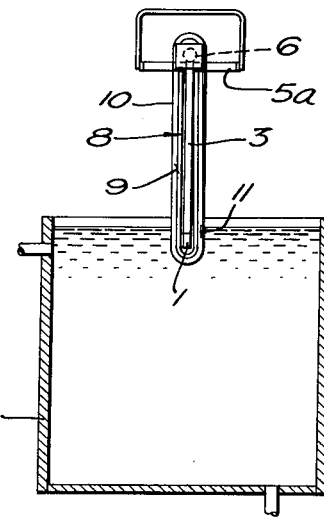
FIG. 8.   FIG. 10.
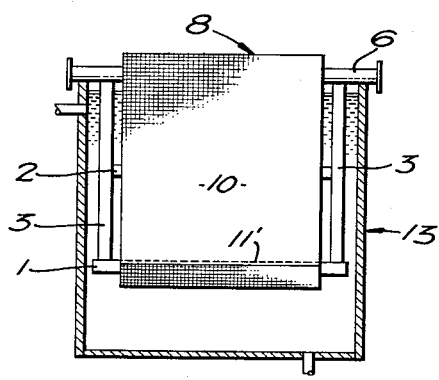
FIG. 9.
INVENTORS
LEON PARKER
EUGENE C. WANG
BY ROBERT C. NORDBERG
ATTORNEY

This invention relates to methods of leaching glass fibers to produce silica fibers. Such methods are well known and are described in U.S. Patents Nos. 2,491,761; 2,500,092 and 2,624,658. In general, these processes depend upon the removal of the non-silicious components of the glass. The silica is in partially hydrated form in the leached fiber. The fiber is then washed to remove the residual acid and salts from the fiber and then fired at a high temperature.

It has been found necessary in producing fibers of desirable physical characteristics that they be washed substantially free of the acid and the residual salts produced by the reaction between the acid and the non-silicious components of the glass. Thus, where hydrochloric acid is employed, it has been found desirable to wash out both the residual acids and the chloride salts to produce a fiber substantially free of chloride ions. This is assured by washing it sufficiently until the removed wash water shows the required low content of the chloride ions.

Municipal or industrial waters, commonly referred to as tap water, are usually alkaline in character and it has been found that in order to wash substantially all of the acid and chlorides out of the fibers using such water, the water must be used in quantities such that the resultant fibers are impaired in quality and sometimes do not have the desirable soft "hand." The results are erratic and the control of the process to produce desired properties becomes difficult and costly.

It has been found that by using neutral waters, that is, waters with a pH of about 7, that an improved product may be obtained. However, the quantity of the neutral water required and the cost of producing distilled or deionized water adds a substantial amount to the cost of producing the fibers. As a result, it has been the practice to wash fibers with the commercially available alkaline water which is usually municipally provided water, and to run the water over these fibers for a time sufficient to remove the residual salts, such as chlorides, from the fiber.

We have found that an improved result may be obtained by employing, instead of neutral or alkaline waters, acid waters, and have found that we may remove substantially all of the salts and produce improved quality of product with a substantial saving in the amount of water and in time required for the removal of such salts. This we obtain by washing the fibers with limited quantities of water in a series of repeated washings and drainings by immersing the fibers into a batch of water, removing the fibers after saturating them with the wash water, and then after withdrawal draining the fibers, and then we reimmerse such washed fibers into a fresh batch of wash water in repeated cycles operations.

It is thus an object of our invention to so wash leached glass fibers to remove the residual salts produced by the leaching operation with acid wash waters in such fashion that the fibers, at the terminus of the washing step, are in contact with acid water substantially free of salts produced by the leaching operation. In such an operation the fibers are washed susbtantially free of salts, but at no time are in contact with waters at a pH as high as 8 and preferably are in contact with fibers at a pH in the range of about 3 to about 5.

We have found that we obtain a surprising improvement in the properties of the fibers and obtain fibers of higher silica content and of softer "hand" and of higher tensile strength by employing our method of washing than when using prior art methods employing alkaline waters, and obtain these results with a very small fraction of the amount of water required in the prior art methods for the removal of the residual salts in the fibers.

The principles of our invention will be further understood by reference to the following examples, which are intended for purposes of illustrating the principles of our invention and not as limitations thereof, taken together with drawings, of which FIGS. 1–5 are charts of the results obtained;

FIG. 6 is a side view of a frame employed in our process;

FIG. 7 is a sectional view showing the cloth in position;

FIG. 8 is a schematic view of the leaching step;

FIG. 9 is a schematic view of the washing step;

FIG. 10 is a schematic view of the draining step.

EXAMPLE I

Acid leached glass fibers in the form of glass fiber woven cloth were leached with hydrochloric acid of 14% concentration by weight at a temperature of 170 to 180° F. for 3½ hours according to the processes described in Patent No. 2,624,658. The leached cloth was introduced into a tank of water taken from the water mains of Los Angeles, California, and having a pH of about 8 and at an ambient temperature. Water was continuously introduced and removed from the tank at the rate of about 5,000 gallons per hour. The cloth was periodically removed from the wash tank and allowed to drain back into the tank. The drippings were caught and a sample of water was simultaneously removed from the tank. The cloth was then immediately reintroduced into the tank. The chloride content and the pH of the drippings of the sample were obtained. This procedure was repeated at various intervals of time. When the tests of the drippings showed a sufficiently low chloride ion present, about 50 parts per million (p.p.m.), the washing was interrupted and the cloth drained and dried, and fired as described in the above patent.

Figure 1:
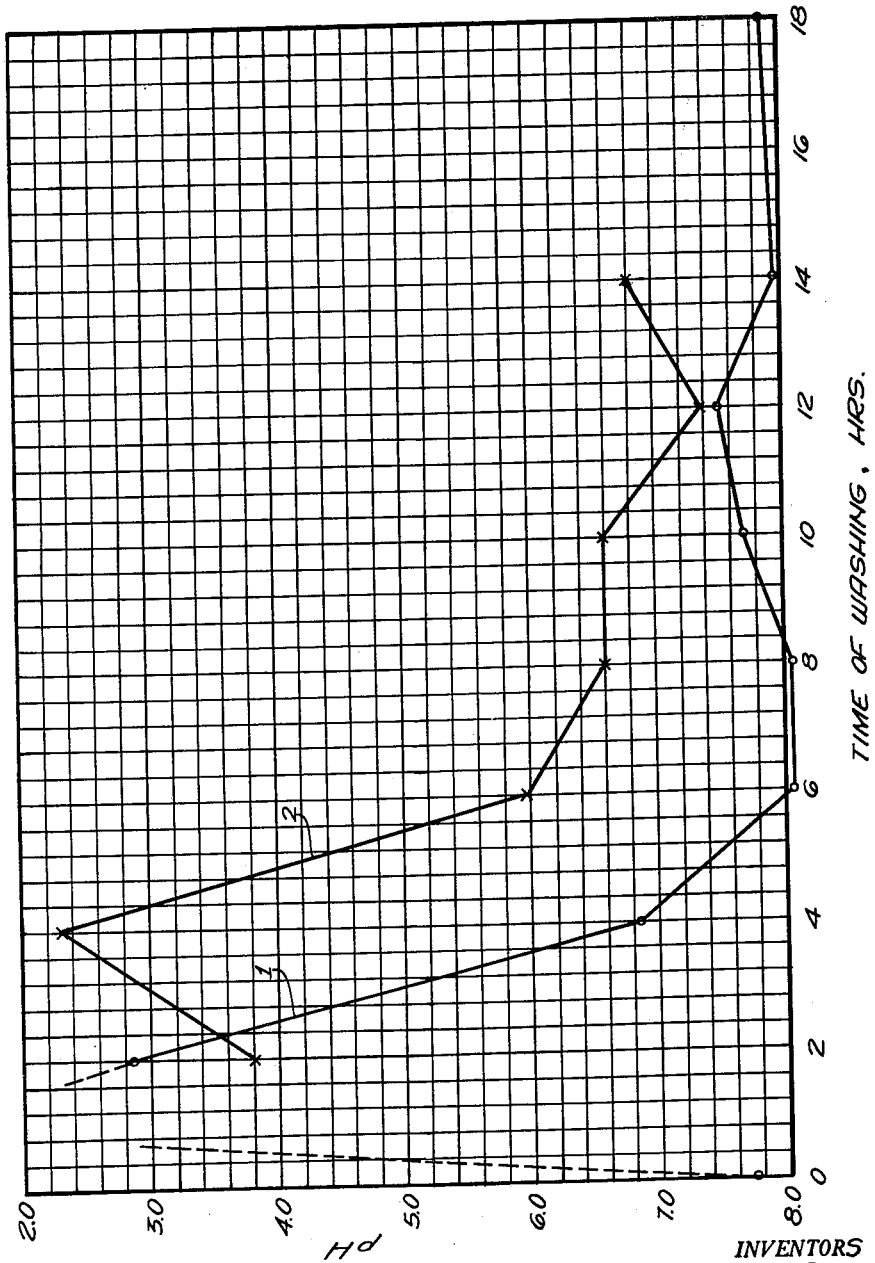

Results showed that it took a total of about 12 to 14 hours to wash the cloth and it took about 400 gallons of water per square yard of cloth. It was found that consistent results as to the "hand" of the cloth were not obtained as between various samples run from cloth washed and from batch to batch of cloth. Sometimes the cloth would be of soft hand, and sometimes it would be more brittle. The results obtained are shown in the following curves:

FIG. 1, curve 1, shows the pH of the wash water and curve 2, the pH of the drippings on removal of the cloth after 2, 4, 6, 8, 10, 12 and 14 hours of washing. It will be observed that on first immersing the cloth after removal from the acid leach a very rapid rise in acid content of the wash water occurs, and as more and more waters pass through the tank, the acidity drops until the drippings come substantially neutral after about 10 to 12 hours of washing.

Figure 2:
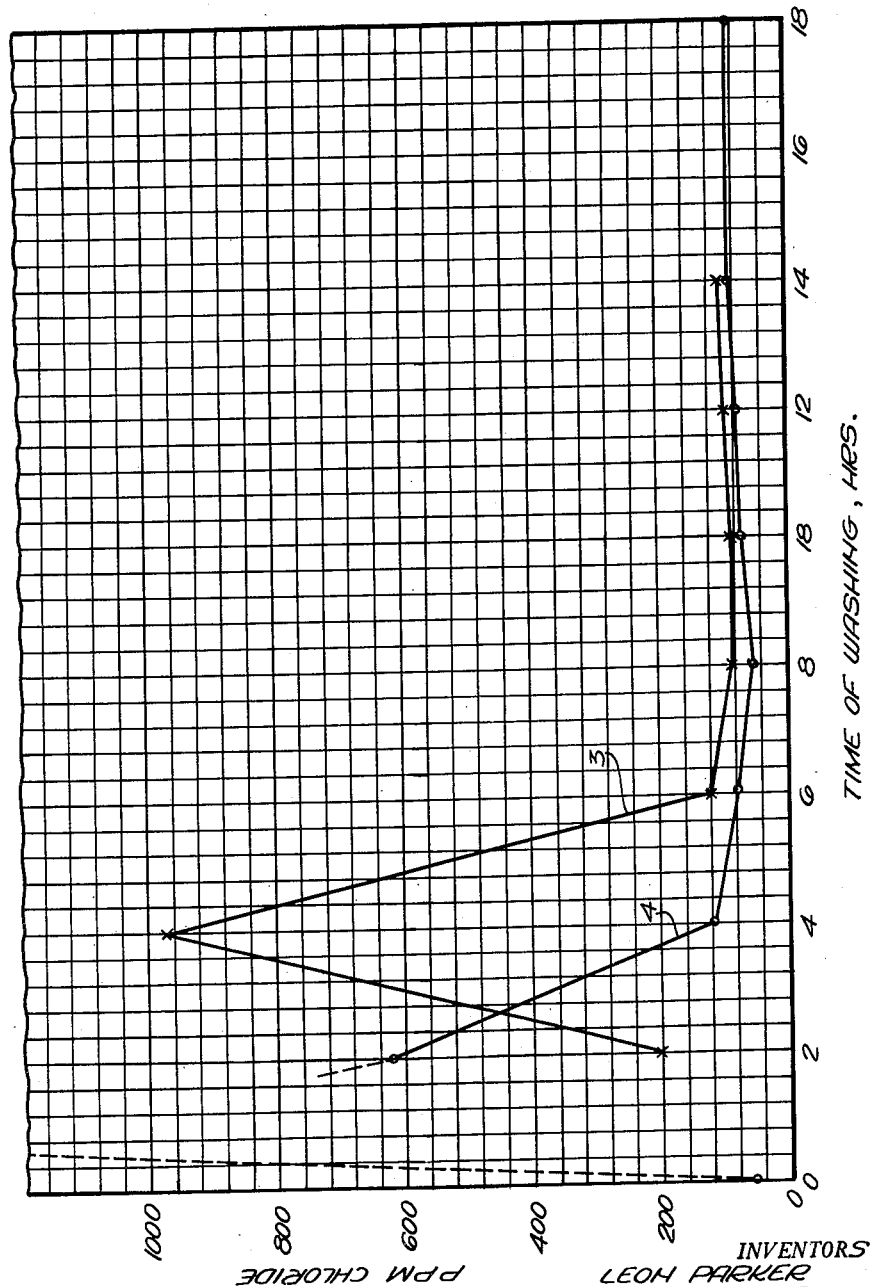

FIG. 2, curve 3 (compare with curve 2 of FIG. 1), shows the corresponding increase in the chloride content in the drippings and curve 4 that of the wash water due to leaching out of the chlorides from the cloth. Thus, when the pH of the drippings decreases from about 4 after 2 hours' washing to about 2.3 after 4 hours' washing, the leaching of the chloride as evidenced by the chloride content of the drippings, rises from about 200 p.p.m. to about 980 p.p.m., and the chloride content of the drippings falls gradually with continued washing until the pH reaches about 6.5, and then remains substantially unchanged at about 50 p.p.m.

Figure 3:
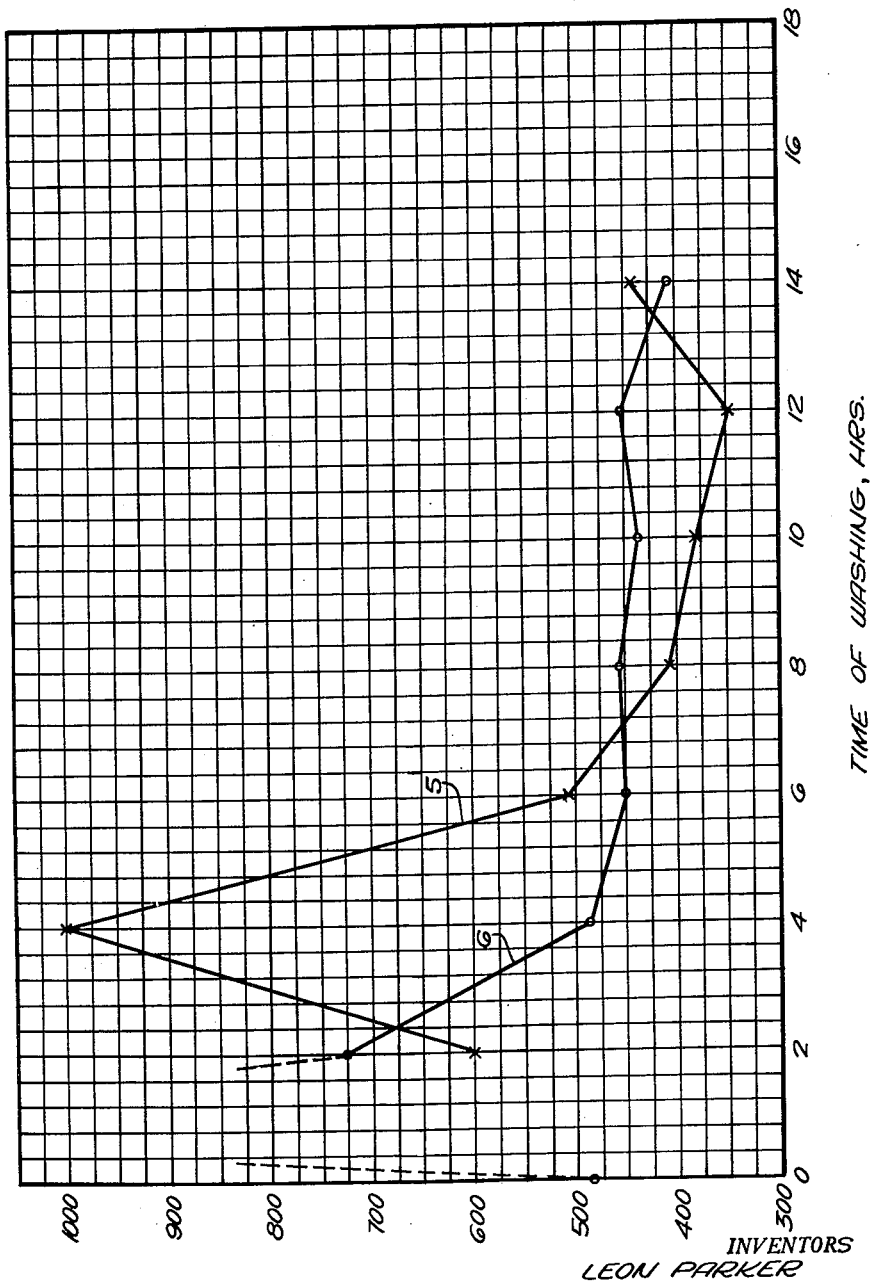

FIG. 3, curve 5, shows the effect of the continued washing out of the total solids content of the drippings, and FIG. 3, curve 6, shows the variation of the total solids content of the wash water with time. The total solids content of the wash water entering the wash tank was 492 p.p.m. Comparing the curves of FIGS. 1, 2 and 3 it will be observed that as the chloride content of the drippings fell to about 100 p.p.m., at which time the pH of the drippings was 6 (see FIG. 2, curve 3), the total solids content of the drippings was about 500 p.p.m. (see FIG. 3, curve 5). As the washing continued, the chloride content of the drippings fell to 50 p.p.m. and the total solids content of the drippings fell to about 350 p.p.m. This indicates that there is a removal of solids from the water by the washed silica fiber. This drop is the more pronounced in view of the removal of chlorides which should increase the solids content of the water, and also in view of the known solubility of silica in water at ambient temperature of about 100 p.p.m.

The cloth was then dried at about 160° F. and fired for 5 minutes at 1800° F. The test results obtained may be summarized as follows in Table 1.

*Table 1*

| | |
|---|---|
| Gallons of water employed per square yard of cloth | 400 |
| Wash time _____ hours | 14 |
| Average percent SiO$_2$ (after firing for 5 minutes at 1800° F.) | 98.6 |
| Texture (hand) | Variable |
| Breaking strength for 1" strip width: | |
|     Warp _____ pounds | 30 |
|     Fill _____ do____ | 25 |

Breaking strength determined by A.S.T.M. test procedure D579-49.

In carrying out this process of our invention, we remove the yarn, batt or bulk fiber, cloth, tape or other textile fabric which has been leached by any of the processes described in any of the aforementioned patents and drain the acid from the fiber. The fiber is then immersed into a tank of water. While we may acidify the water to produce a pH of about 3 to about 5, before immersion of the cloth it is not necessary to do so, since the fiber will have sufficient acid to acidify the 8 pH water to about the region of about 3 to about 5 pH. If the drippings from the fiber as they are removed are sufficiently acid, it will be evidence of the fact that proper acidification of the water by the contained acid has occurred. If the pH of the drippings is in the region of 7 or higher, pre-acidification may be necessary. Usually it will not be necessary under the above conditions.

After immersion, the fiber is withdrawn and allowed to drain. The yarn, batt, bulk fiber or textile fabric mass is rotated on immersion to insure uniform washing. This is repeated several times. The fiber is re-immersed into a fresh tank of like water without pre-acidification, since the retained acidity of the fiber will be sufficient to acidify the water to the proper pH as described above. The process of washing, removal, draining and re-immersion is followed in the second tank similar to that in the first tank. The washed fiber is then withdrawn from the second tank and re-immersed into a third tank of fresh water in which the water has been pre-acidified prior to immersion of the fiber by the addition of an acid to about a pH of about 5 or less.

We prefer, when the leaching is with hydrochloric acid, to use nitric acid, or some acid other than hydrochloric acid, for example, sulfuric acid, since the washing out of the salt may then be conveniently followed by determining the chloride content of the drippings resulting from the washing out of the salts formed in the leaching operation. As between the nitric acid and the sulfuric acid, we prefer to use nitric acid since the nitrates of the alkaline earth ions present in the water are more soluble than the sulphates. We may, however, employ any acid, even hydrochloric acid, in the acidification step, since as will be shown below, a multiple washing, for example, five or more batches of water, will prove sufficient without making the analysis employed in the test procedure.

The fiber is immersed in the pre-acidified water and withdrawn and drained, and re-immersed two or three times and then withdrawn from the tank and inserted into a fourth tank, acidified in the same manner, and washing operation repeated in the fourth tank. This may be repeated in the fifth and subsequent tanks until it has been found that the drippings from the fibers show the desired content of chloride below 100 p.p.m. and preferably in the region of 60 or a lower number of parts per million. The chloride content is determined by titration with 0.005 N AgNO$_3$ (silver nitrate) using potassium chromate as an indicator and calculated as chloride.

The following examples illustrate the results obtained by employing the washing step of our invention.

EXAMPLE II

The following example shows the results obtained when applied to the same amount of like leached fiber fabric as described in Example I and produced under the same leaching conditions.

In carrying out our process, we, where the process involves the acid leaching and washing of textile fabric, loosely wind the fabric as it is removed from a bolt of fabric on a frame. A suitable frame is shown in FIG. 6. It is composed of lower and intermediate cross members 1 and 2, to which are connected uprights 3. An acid resistant pipe, such as a resinous pipe 6, having square end flanges, is loosely mounted on the uprights 3 and loosely mounted on the removable cross bars 5a of the frame 5' to which the bail 5 is removably connected. The fabric 8 is loosely wound in many turns on the frame and at the end of the fabric an acid resistant covering cloth 10 woven of a synthetic fiber which is acid resistant is sewed at 9 to the end of the covering cloth. A suitable fabric is a dynel fabric formed of a vinylchloride-acrylonitrile copolymer or any suitable cloth or coating, for example, one such as is employed in the Parker et al. Patent No. 2,500,092. The fabric may be sewed to the covering cloth with acid resistant yarn formed of fibers similar to that used in making the cloth or by means of an acid resistant metal wire. The end of the covering cloth may be held by a similar expedient at 11'.

The frame is immersed into the acid solution in tank 11 with the pipe 6 positioned on the sides 12 of the tank 11. The acid is heated and the pipe 6 is periodically rotated, dragging the fabric through the solution, thus exposing all parts of the cloth to a like acid treatment; thus, for example, in the procedure reported in Examples II and III the cloth was treated with about 14% by weight HCl water solution at 170–180° F. for 5 hours. After the treatment the frame is removed from the tank 11 and introduced directly into the washing tank 13 which had been previously filled with water from the Los Angeles City mains and which had a pH of about 8. The pipe 6 was rotated periodically so that the fabric was washed substantially uniformly by the body of water in the tank. After thorough contact of the entire roll of fabric with the water the frame was lifted until only the lower end of the roll was immersed in the water, as is indicated in FIG. 10 of the drawings. The purpose of permitting the lower end of the roll to remain immersed in the wash water is to prevent the cascading of the water out of the roll and damage to the cloth. The drippings drain down the cloth and displace the water in the tank adjacent the lower end of the roll. In the experiments a sample of the drippings was taken from between the fabric layers.

After the cloth has dripped sufficiently to remove the excess liquid, the frame is removed from the wash water in the tank. A second tank of fresh city water is prepared and the tank is acidified. In the examples reported the pH was adjusted with $HNO_3$ to a pH of 5. The frame was inserted, washed, withdrawn and drained as described above. This washing step was repeated a number of times, as described in the experiments.

The Examples II and III were carried out according to the above procedure. It was found that five batches each of 700 gallons of water was sufficient to leach the salts from fabric to the desirable degree from the same yardage of fabric as was employed in Example I.

Figure 4:
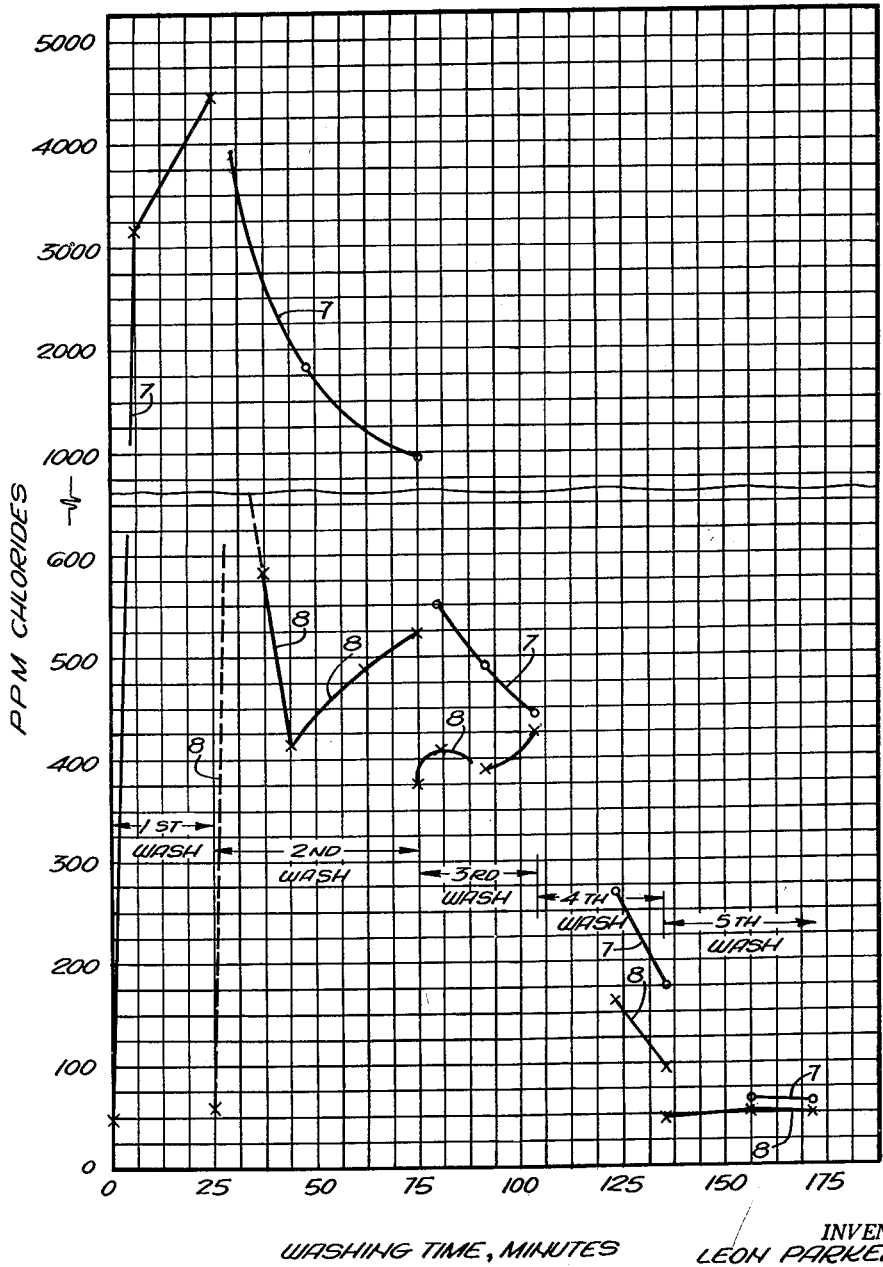

Tables 2 and 3 and FIG. 4 give the results of these tests.

*Table 2*

| Wash Cycle | Gallons | Total pound Cl- | Chlorides in Drippings— p.p.m. Cl- drop per gallon wash water |
|---|---|---|---|
| 1st tank | 700 | 35 | 29 |
| 2nd tank | 700 | 3.0 | 12 |
| 3rd tank | 700 | 2.5 | 0.6 |
| 4th tank | 700 | 0.6 | 0.4 |
| 5th tank | 700 | 0.4 | 0.1 |
| Total | 3,500 | | |

*Table 3*

| Wash Tank 700 gallon/tank | Time after first immersion in water, min. | Chloride Content, p.p.m. Wash Water | Chloride Content, p.p.m. Drippings |
|---|---|---|---|
| 1st washing | 0 | 50 | |
|  | 25 | 4,250 | |
| 2nd washing | 0 | 50 | |
| 1st withdrawal | 10 | 595 | |
| 2nd withdrawal | 20 | 410 | 1,900 |
| 3rd withdrawal | 35 | 495 | 1,025 |
| 4th withdrawal | 50 | 520 | 950 |
| 3rd washing | 0 | 50 | |
| 1st withdrawal | 3 | 402 | 550 |
| 2nd withdrawal | 15 | 390 | 490 |
| 3rd withdrawal | 30 | 425 | 440 |
| 4th washing | 0 | 50 | |
| 1st withdrawal | 13 | 140 | 240 |
| 2nd withdrawal | 38 | 90 | 150 |
| 5th washing | 0 | 50 | |
| 1st withdrawal | 13 | 50 | 60 |
| 2nd withdrawal | 17 | 50 | 60 |

These results are shown on FIG. 4, in which the curve 7 gives the chloride content of the drippings, while the curve 8 gives the chloride content of the wash water at the same point in the washing operation as when the drippings were obtained. The cloth was dried and fired as described in Example I. The product produced employing the same cloth and the same leaching operation, the same test procedures as Example I, gave the following results.

*Table 4*

|  | Percent |
|---|---|
| Silica content (after firing) | 99.2 |
| Tensile strength in pounds: [1] |  |
| Warp | 30 |
| Fill | 40 |
| Texture | Soft |

[1] Test procedure, see Table 1.

The following table compared the quantity of water required to obtain like chloride contents in the drippings when using the continuous process of Example I and the discontinuous process of Example II on like quantities of like leached cloth. Since the chloride content of the drippings from the washed fibers is also the chloride content of the washed fibers, the tables give the comparative efficiency of the two procedures in reducing the chloride content of the fibers.

*Table 5*

| Drippings Chlorides, p.p.m. | Gallons of Water Employed and Time (minutes) | | | |
|---|---|---|---|---|
|  | Example I | | Example II | |
|  | Gallons | Minutes | Gallons | Minutes |
| 1,000 | 20,000 |  | 1,400 |  |
| 440 | 23,000 |  | 2,100 |  |
| 150 | 30,000 |  | 2,800 |  |
| 60 | 70,000 | 840 | 3,500 | 150 |

Figure 5:
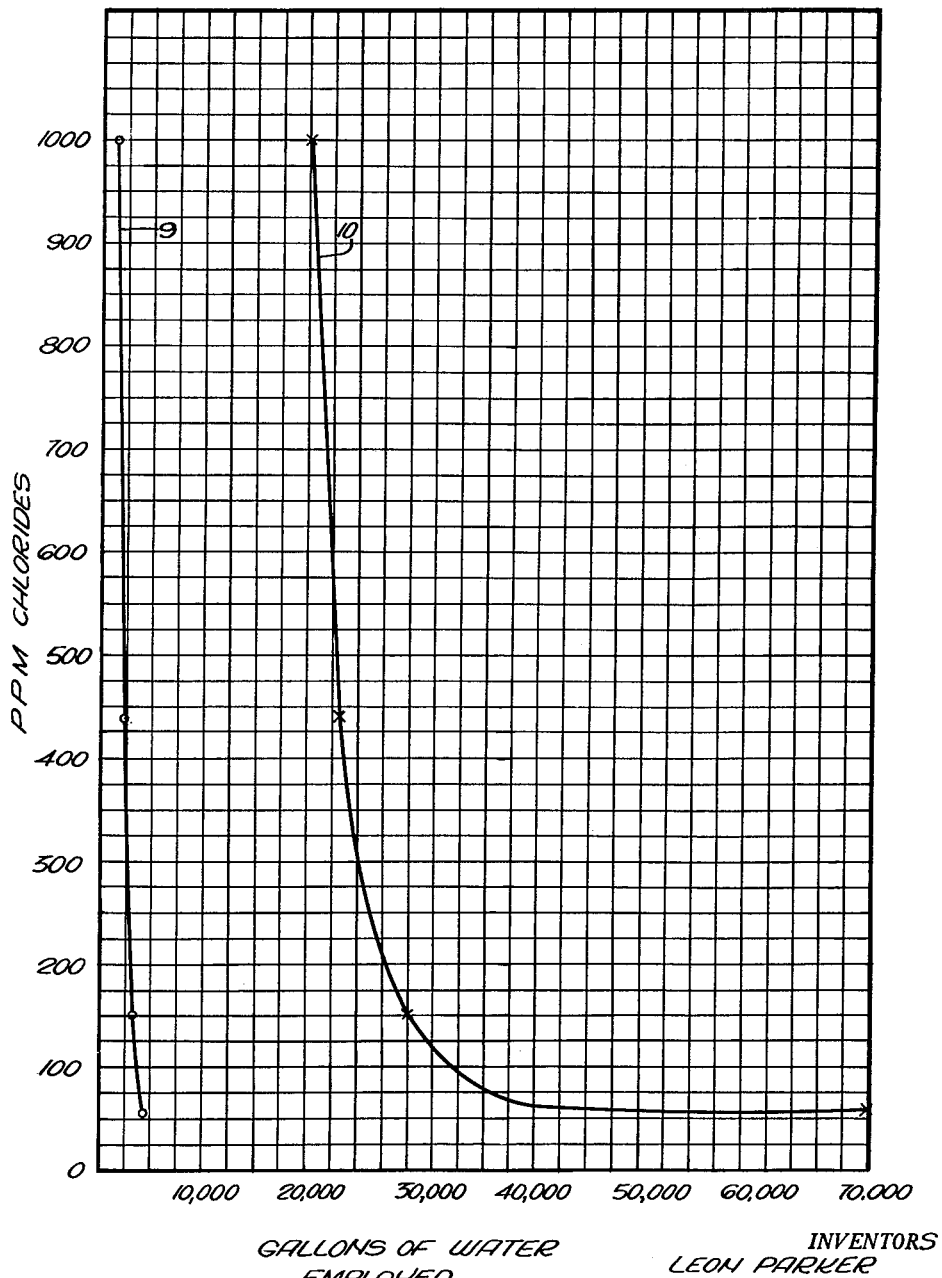

The quantity of the water required for the same reduction in chloride content to 60 p.p.m., at which the fiber can be considered to be adequately washed, was 20 times greater when using the continuous system employing conventional waters of a pH of about 8, curve 10, FIG. 5, as compared to the rinse washing with acid water by discontinuous process described in Example II, curve 9, FIG. 5, and the time of contact between the water and the fabric is 5.6 as great.

The tests show that there is much less reaction between the ions of the washed water and the hydrated silica in the process of Example II than in Example I, as is evidenced by the higher silica content of the fiber. The increase in the strength of the cloth is also important.

It will be observed that the reduced volume of water and contact time as well as the acidity control produce a fabric of higher silica content, i.e., the ratio of $SiO_2$ to non-silicon oxides is greater in leached fibers produced according to the procedure of our invention.

Without wishing to be bound by any theory of why such improved results are obtained by our invention, the decrease in the silica content may be ascribed either to reduced adsorption from the water or reduced selective leaching of $SiO_2$ or it may be due to both. The data, however, is indicative of the superior nature of the washing procedure in producing fibers of finer silica.

For many purposes it is desirable to have as high silica content as possible since the softening and melting points are increased as the percent silica is increased. It will be observed that notwithstanding the fact that the fabric washed by the prior art procedure had a silica content of 98.6%, while the fabric produced by our washing method had a silica content of 99.2%, the fabric produced by our process was markedly softer and had greater breaking strength than the fabric produced by leaching of fibers followed by the prior art washing process.

EXAMPLE III

Example III was run under the same conditions as Example II and sampled and tested in the same way. Table 6 gives the results obtained.

Table 6

| Wash Cycle | Wash Waters | | | | Drippings | | | |
|---|---|---|---|---|---|---|---|---|
| | Chloride Content, Parts Per Million | | Solids Content, Parts Per Million | | Chloride Content, Parts Per Million | | Solids Content, Parts Per Million | |
| | Run 1 | Run 2 | Run 1 | Run 2 | Run 1 | Run 2 | Run 1 | Run 2 |
| Water | 22 | 22 | 400 | 400 | | | | |
| 1 | 11,000 | 8,804 | 1,900 | 5,200 | 11,300 | 9,123 | 1,920 | 5,200 |
| 2 | 876 | 950 | 520 | 1,000 | 1,099 | 1,056 | 540 | 1,000 |
| 3 | 319 | 240 | 540 | 700 | 425 | 332 | 550 | 1,200 |
| 4 | 75 | 94 | 580 | 800 | 78 | 131 | 580 | 740 |
| 5 | 53 | 53 | 620 | 700 | 54 | 62 | 600 | 760 |
| 6 | | 52 | | 680 | | 54 | | 620 |

It is significant that in run 1 the solids content of the drippings come to an apparent equilibrium at 500–600 parts per million after the second wash and remain substantially constant while chloride content drops. Since the purpose of the wash procedure is to remove salts from the fabric, the acid evaporating during firing, the above data indicates that the washing in run 1 could be stopped after the second tank with a further saving of 60% of the water employed on Example II.

The discrepancy in the values of the first wash (run 1 and run 2) indicates that the system is far from equilibrium after the second wash of run 2. It will be seen, however, that by the fourth wash the solids content in each run reached a stable value at about 600 to 700 parts per million and that the chloride content was reduced to the region of 50 to 60 parts per million by the fifth wash.

In carrying out our process on hydrochloric and leached glass fiber, we follow the degree of washing by tests by the chloride content of the drippings as previously described in connection with Example I and employ an acid other than the hydrochloric acid to adjust the pH of the water when it is above about 4.5 to 5.5, for example, 6 or more, and particularly when the waters are strongly alkaline as in the case of the municipal water of Los Angeles, where the water has a pH of about 8. We continue the repeated cycles of washing and draining until the draining shows a chloride ion content of substantially less than 100 parts per million, preferably about 50 to 75 parts per million, depending on the chloride content of the water. We prefer to employ water with sufficiently low chloride ion content to permit such a degree of washing, i.e., one having chloride ion content of not more than the above limits.

While we have described a particular embodiment of our invention for purposes of illustration, it should be understood that various modifications and adaptations thereof may be made within the spirit of the invention as set forth in the appended claims.

We claim:

1. A method for treating glass fibers, which have been leached with an acid, by discontinuous batch washing in commercially available tap water having an unadjusted pH in excess of about 6 to remove residual solids and acid left by the leaching operation comprising the steps of removing the acid from the leached glass fibers; adding wash water having an adjusted pH such that the wash water in the presence of the leached glass fibers will have a pH below 5; removing the wash water from the fibers; adding a second wash water having an adjusted pH such that the wash water in the presence of the fibers will have a pH below 5; and removing the second wash water from the fibers, whereby the fibers will be rendered substantially free of the leaching acid and of residual solids which are insoluble at pH values higher than that of the wash water.

2. The process according to claim 1 wherein the steps of washing the fibers in water with a pH below 5 and subsequently removing the wash water are continued in repeated cycles.

3. The method of claim 2 wherein the leaching acid is hydrochloric acid and the pH of the wash water is adjusted by the addition of an inorganic acid.

4. The method of claim 3 wherein the inorganic acid is other than hydrochloric acid.

5. The method of claim 3 wherein the cycles are continued until the removed wash water contains not more than about 100 parts per million of chloride ions.

6. A method for treating glass fibers, which have been leached with an acid, by discontinuous batch washing in commercially available tap water having an unadjusted pH in excess of about 6 to remove residual solids and acid left by the leaching operation comprising the steps of removing the acid from the leached glass fibers; adding wash water having an adjusted pH such that the wash water in the presence of the leached glass fibers will have a pH below 5; removing the wash water from the fibers; adding a second wash water having an adjusted pH such that the wash water in the presence of the fibers will have a pH below 5; removing the second wash water from the fibers; and continuing the steps of adding and removing wash water until the fibers are rendered substantially free of the leaching acid and of residual solids which are insoluble at pH values higher than that of the wash water.

7. A method for treating glass fibers, which have been leached with an acid, by discontinuous batch washing in commercially available tap water having an unadjusted pH in excess of about 6 to remove residual solids and acid left by the leaching operation comprising the steps of removing the acid from the leached glass fibers; adding wash water having an adjusted pH such that the wash water in the presence of the leached glass fibers will have a pH in the range of 3 to 5; removing the wash water from the fibers; adding a second wash water having an adjusted pH such that the wash water in the presence of the fibers will have a pH in the range of 3 to 5; removing the second wash water from the fibers; and continuing the steps of adding and removing wash water until the fibers are rendered substantially free of the leaching acid and of residual solids which are insoluble at pH values higher than that of the wash water.

References Cited in the file of this patent

UNITED STATES PATENTS

| 2,658,848 | Labino | Nov. 10, 1953 |
| 2,730,475 | Parker | Jan. 10, 1956 |
| 2,843,461 | Labino | July 15, 1958 |